US012360678B1

(12) United States Patent
Swanson et al.

(10) Patent No.: US 12,360,678 B1
(45) Date of Patent: Jul. 15, 2025

(54) RUNTIME MEMORY REPAIR WITHOUT REQUIRING A REBOOT OF A SERVER COMPUTER

(71) Applicant: Amazon Technologies, Inc., Seattle, WA (US)

(72) Inventors: Robert Charles Swanson, Olympia, WA (US); Maulik Kapuria, Sunnyvale, CA (US); Tsung Ho Wu, Pleasanton, CA (US); Sang Phill Park, Sammamish, WA (US); Pankaj Kumar Rai, San Jose, CA (US); Yuhui Zheng, Seattle, WA (US); Nandagopal Sathyanarayanan, Renton, WA (US); Filippo Sironi, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/081,419

(22) Filed: Dec. 14, 2022

(51) Int. Cl.
*G06F 3/06* (2006.01)

(52) U.S. Cl.
CPC .......... *G06F 3/0617* (2013.01); *G06F 3/0635* (2013.01); *G06F 3/0673* (2013.01)

(58) Field of Classification Search
CPC .. G06F 3/0619; G06F 3/0616; G06F 12/0246; G06F 11/073; G06F 3/0653; G06F 3/0634; G06F 3/0683; G06F 3/0679; G06F 3/0673; G06F 3/0617; G06F 3/0635
USPC ......... 711/103, E12.008, 105, 154, E12.001, 711/100
See application file for complete search history.

(56) References Cited

U.S. PATENT DOCUMENTS

| | | | |
|---|---|---|---|
| 9,928,884 B1* | 3/2018 | Gou | G11C 7/12 |
| 2009/0144579 A1* | 6/2009 | Swanson | G06F 11/0712 718/1 |
| 2014/0181576 A1* | 6/2014 | Chahal | G06F 9/45558 718/1 |
| 2018/0173880 A1* | 6/2018 | Duale | G06F 11/3688 |
| 2020/0341658 A1* | 10/2020 | Hebsur | G06F 3/065 |
| 2021/0191829 A1* | 6/2021 | Muthiyalu | G11C 29/84 |
| 2023/0195568 A1* | 6/2023 | Hong | G06F 11/073 714/764 |

* cited by examiner

*Primary Examiner* — Jared I Rutz
*Assistant Examiner* — Edward Waddy, Jr.
(74) *Attorney, Agent, or Firm* — Klarquist Sparkman, LLP (57) ABSTRACT

A host server computer with an uncorrectable memory error can be repaired without a reboot operation. While initially booting a hypervisor, a special software Application Programming Interface (API) can be loaded between a BIOS System Management Mode (SMM) code and the hypervisor. Once the host server computer is booted and a number of virtual machines are executing, a memory error (e.g., uncorrectable error correction code (UECC)) can occur. In response, the hypervisor calls into the special software API identifying the defective memory rows that the BIOS needs to repair. The BIOS starts a soft Post Package Repair (PPR) process on those rows and gives back control to the hypervisor. When the repair is completed, the hypervisor loads a scrubbing virtual machine and validates that the memory is corrected. After the repair is validated, the hypervisor allows the available partition to take a new customer instance.

17 Claims, 9 Drawing Sheets

RUNTIME MEMORY REPAIR WITHOUT REQUIRING A REBOOT OF A SERVER COMPUTER

BACKGROUND

Dynamic random-access memory (DRAM) has a high capacity with a low cost, but its memory cells are densely arranged. Such high densities of memory cells can cause DRAM cells to fail. As a result, DRAM manufacturers have employed repair schemes that replace errors in core arrays with good cells using spare rows and columns. These so-called "redundant memory cells" can be used to functionally replace bad memory cell(s) identified in a memory cell array. Replacing bad memory cells is accomplished using a procedure called Post Package Repair (PPR). Both hard and soft PPRs can be available. A hard PPR permanently remaps access from a faulty row to a designated spare row and is persistent. A soft PPR temporarily remaps access from the faulty row to the designated spare row and the remapping is lost after a reboot operation. In either case, a system reboot can be required to physically swap the memory. In a multi-tenant environment where multiple tenants may be operating on a server computer, a system reboot of the server computer can be a major disruption in service. For example, a system reboot can require one hour of downtime, wherein tenants are either disrupted or migrated to a different server computer.

DETAILED DESCRIPTION

Currently, when an uncorrectable memory error occurs on a server computer, a hypervisor winds down any executing virtual machines operating on the server computer and the server computer is shut down for repair. A technician can then swap out the memory and perform a reboot of the server computer. The server computer can be shut down for weeks, potentially disrupting service to customers.

In one embodiment, a server computer with one virtual machine or multiple virtual machines can terminate one of the virtual machines associated with corrupted memory, while allowing other virtual machines to remain activated. A hypervisor executing on the server computer can receive an indication of a defective memory module. The hypervisor can then determine which virtual machine is associated with the defective memory module. For example, the memory modules can be dual in-line memory modules (DIMMs) and each DIMM can be associated with a virtual machine. When the indication is received by the hypervisor that the DIMM is defective, the hypervisor can request the associated virtual machine to shut down. Once the virtual machine is shut down, the hypervisor can notify a trusted controller to initiate a memory repair. The trusted controller can be a Basic Input/Output System (BIOS) or a Baseboard Management Controller (BMC). Other trusted controllers can be used. The trusted controller can initiate an interrupt, such as a System Management Interrupt (SMI), to processors on the host server computer. The processors can temporarily suspend the hypervisor and the virtual machines while the memory is being repaired. A PPR request can be made to a memory controller, which proceeds to repair the defective memory. After the memory is repaired, the processors resume the hypervisor and the virtual machines. The hypervisor can then instantiate a memory-testing virtual machine that can write a pattern into the repaired memory, read the pattern back, and compare the written and read patterns to ensure that they are identically matched. Using such a comparison, a determination can be made that the memory is corrected. If the memory is corrected, the hypervisor can transmit a notice that the partition is available for launching a new virtual machine. In some embodiments, a single virtual machine can be executing on the server computer and the single virtual machine can be terminated while the hypervisor remains active during the repair of the memory.

There are multiple advantages to the embodiments described herein. First, the host server computer does not need to reboot to repair memories. Additionally, virtual machines that are executing on the server computer and that are not impacted by the defective memory can continue to execute (although they might be suspended during the memory repair, which is less than 1 second). Additionally, the hypervisor does not need to be suspended during the memory repair. Finally, customers executing on the virtual machines that are not impacted by the defective memory do not need to migrate their virtual machines to other computers.

Figure 1:
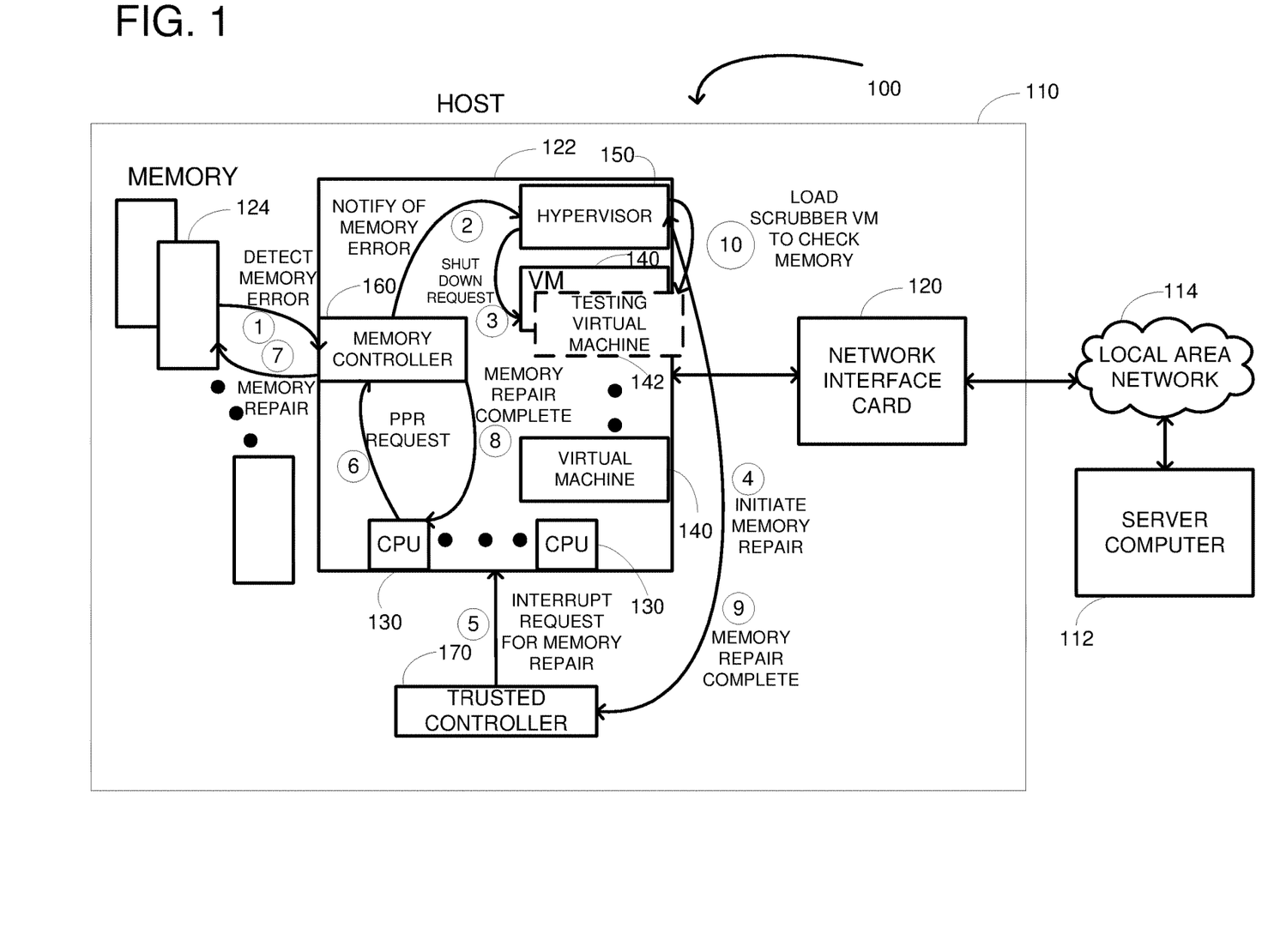
FIG. 1 is a host server computer according to one embodiment that can perform a memory repair without rebooting, wherein a trusted controller is used to generate an interrupt for the memory repair.

FIG. 1 is an embodiment of a system 100 including a server computer 110 coupled to a remote server computer 112 through a network 114. In this example, the server computer 110 includes a network interface card 120, a motherboard 122, and separate slots for accepting memory modules 124, which can be present on the motherboard 122 or on a separate card. The motherboard 122 also includes multiple central processing units (CPUs) 130. The CPUs 130 can include a general-purpose CPU, a processor in an application-specific integrated circuit (ASIC) or any other type of processor. Any number of CPUs 130 can be positioned on the motherboard 122. Each CPU can execute a corresponding virtual machine 140. The hypervisor or kernel layer can be classified as a type 1 or type 2 hypervisor. A type 1 hypervisor runs directly on the host CPUs 130 to control the hardware and to manage guest operating systems in the virtual machines 140. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used.

The memory modules 124 can include DIMMs comprising a series of DRAM integrated circuits. The memory modules 124 are coupled to a memory controller 160, which can receive and implement PPR requests through the CPUs 130. A trusted controller 170 executes on the motherboard 122 or separated therefrom on a plug-in card (not shown) within the host server computer 110. Example trusted controllers are described below in FIGS. 2 and 3 and include BIOS and a BMC, respectively. The server computer 114 can be a cloud server computer as further described below in relation to FIG. 4. Specifically, the server computer 114 can be an instance manager that is notified of availability on partitions within the host server computer 110. The server computer 114 can then launch new virtual machines 140 on the host server computer 110. However, if the hypervisor 150 indicates that there are not available partitions, the host server computer 114 is blocked from loading new virtual machines.

The numbered circles in FIG. 1 indicate a logical flow for repairing the memory 124 when there is an uncorrectable memory error. At 1, a memory error is detected by the memory controller 160 for an error within one of the memory modules 124. At 2, the memory controller 160 notifies the hypervisor 150 of the memory error and the type of memory error, such as an uncorrectable memory error. At 3, the hypervisor 150 determines which virtual machine 140 is associated with the defective memory module. In one example, each memory module is associated with one virtual machine 140 so that the hypervisor 150 can associate the defective memory module with one of the virtual machines 140. The hypervisor 150 can then communicate with the determined virtual machine and request that it be shut down or otherwise terminated. At 4, the hypervisor 150 can communicate with the trusted controller 170 and request that a memory repair be initiated. The communication at 4 can be a System Management Interrupt (SMI) handler or an EL3. The trusted controller 170 can then initiate an interrupt at 5, which can be directed to a single CPU 130 or all of the CPUs. It is estimated that the memory repair is less than 1 second (e.g., 100 microseconds). If directed to all of the CPUs then the hypervisor is temporarily suspended during the interrupt but resumes during the remainder of the memory repair. At 6, the PPR request is passed to the memory controller 160, which then initiates the repair at 7. At 8, the memory controller 160 communicates with the CPU 130 that the repair is complete, which is likewise communicated to the trusted controller 170. At 9, the trusted controller 170 informs the hypervisor 150 that the memory repair is complete. In response, the hypervisor 150 can instantiate a scrubber virtual machine to test the memory (at 10). The scrubber virtual machine is a memory-testing virtual machine 142 that can write a pattern to the defective memory and read back the pattern to ensure that the memory is operating correctly. Once the memory testing is complete, the hypervisor 150 can terminate the memory-testing virtual machine and open the partition to a new instance by communicating with the server computer 114 through the network interface card. It should be noted that prior to opening the partition to the new instance, the hypervisor can make it appear to the server computer 114 that the partition is not available. even if the partition is open. The memory repair can therefore be completed before opening the partition to the new instance.

Although the memory 124 is shown within the server computer 110, it can be positioned external to the server computer. Additionally, although the memory controller 160 is shown separate from the CPUs 130, multiple CPUs and the memory controller can be integrated into a single Integrated Circuit (IC), which is called CPU hardware hereinafter.

Figure 2:
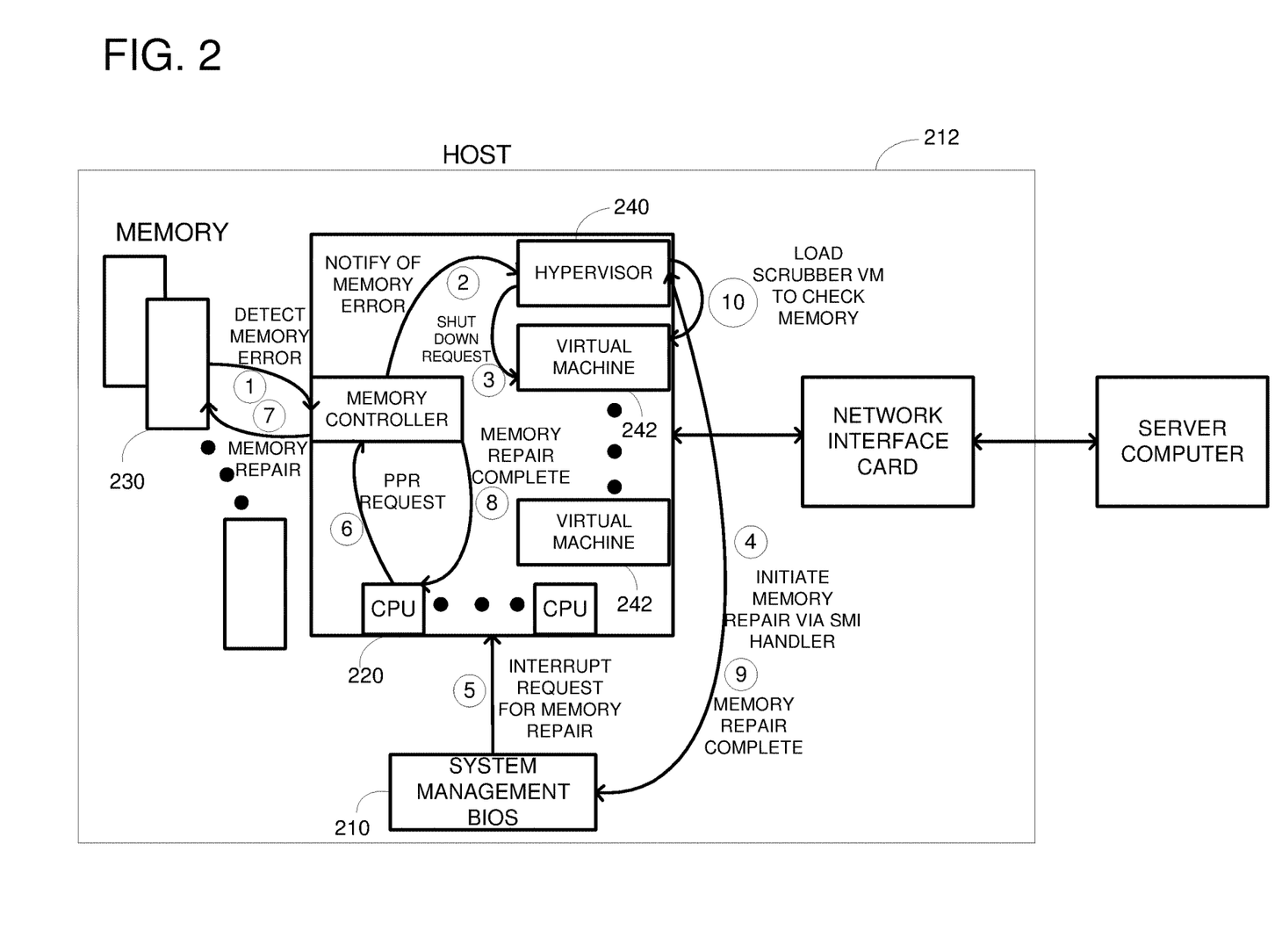
FIG. 2 is the host server computer of FIG. 1, wherein the trusted controller is a system management Basic Input/Output System (BIOS).

FIG. 2 shows another embodiment wherein the trusted controller 170 (FIG. 1) is a system management BIOS 210. Otherwise, the steps associated with the circled numbers are the same as FIG. 1 and are not repeated for simplicity. It should be noted that the system management BIOS 210 takes control of one or more CPUs 220 and performs a soft repair on a row of a memory 230 that is defective. Once the row of the memory is repaired, the system management BIOS 210 can give control back to a hypervisor 240. When booting the hypervisor 240, a special software Application Programming Interface (API) is loaded between the BIOS System Management Mode (SMM) code and the hypervisor 240. Once the host server computer 210 is booted and a number of virtual machines 242 are executing, a memory error called an uncorrectable error correction code (UECC) can occur. The hypervisor 240 calls into the special software API identifying the defective memory rows that the system management BIOS 210 needs to repair from the UECC. The system management BIOS 210 starts a soft PPR process on those rows and gives back control to the hypervisor 240. When the repair is completed, the hypervisor 240 loads a scrubbing virtual machine and validates that the memory is corrected after the online repair operation. After the repair is validated, the hypervisor allows the slot to take a new customer instance. Some advantages include that the server computer no longer needs a physical reboot for UECC errors, there is no longer a need to degrade servers due to memory failures, and virtual machines executing on the server are minimally impacted by no suspension or a microsecond suspension of the virtual machines.

The special software API is a programmatic interface to a defined request-response message system, typically expressed in JSON or XML, which is exposed via the web-most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component.

Figure 3:
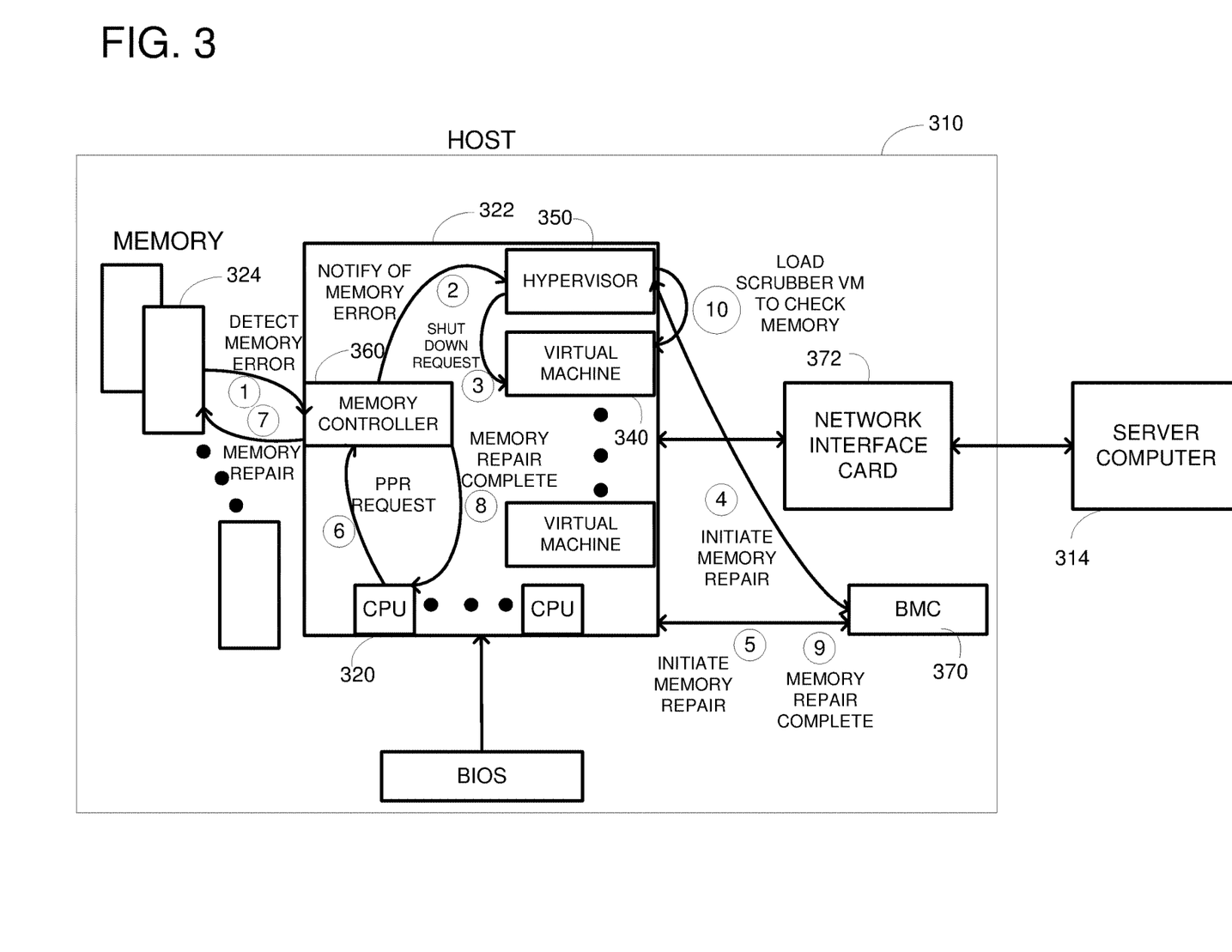
FIG. 3 is the host server computer of FIG. 1, wherein the trusted controller is a Baseboard Management Controller (BMC).

FIG. 3 shows yet another embodiment of a host server computer 310 wherein the trusted controller 170 (FIG. 1) is a BMC 370 coupled to a motherboard 322. In this embodiment, at 1, a memory defect is detected by a memory controller 360 for a memory 324. At 2, the memory controller 360 notifies a hypervisor 350 of the memory defect. At 3, the hypervisor 350 instructs a virtual machine 340 to terminate due to an uncorrectable memory error. At 4, the hypervisor 350 notifies the BMC 370 of the memory error and indicates that a memory repair is to be initiated. The communication from the hypervisor 350 to the BMC 370 can occur via a network interface card 372 or through a direct connection between the motherboard 322 and the BMC. At 5, the BMC initiates the memory repair through a side-band channel to the motherboard 322. The initiation of the memory repair can generate interrupts in one or more of the CPUs 320. At least one of the CPUs 320 can instruct the memory controller 360, at 6, to repair the uncorrectable memory error. At 7, the memory repair is performed. At 8, the memory controller 360 instructs the CPU 320 that the memory repair is complete. The BMC 370 is correspondingly notified at 9. At 10, the hypervisor 350 can be instructed to load a scrubber virtual machine to test that the memory 324 is now working effectively. The hypervisor 350 can then shut down the scrubber virtual machine and open the partition to a new virtual machine. A server computer 314 can then launch a new virtual machine 340 on the host server computer 322.

Figure 4:
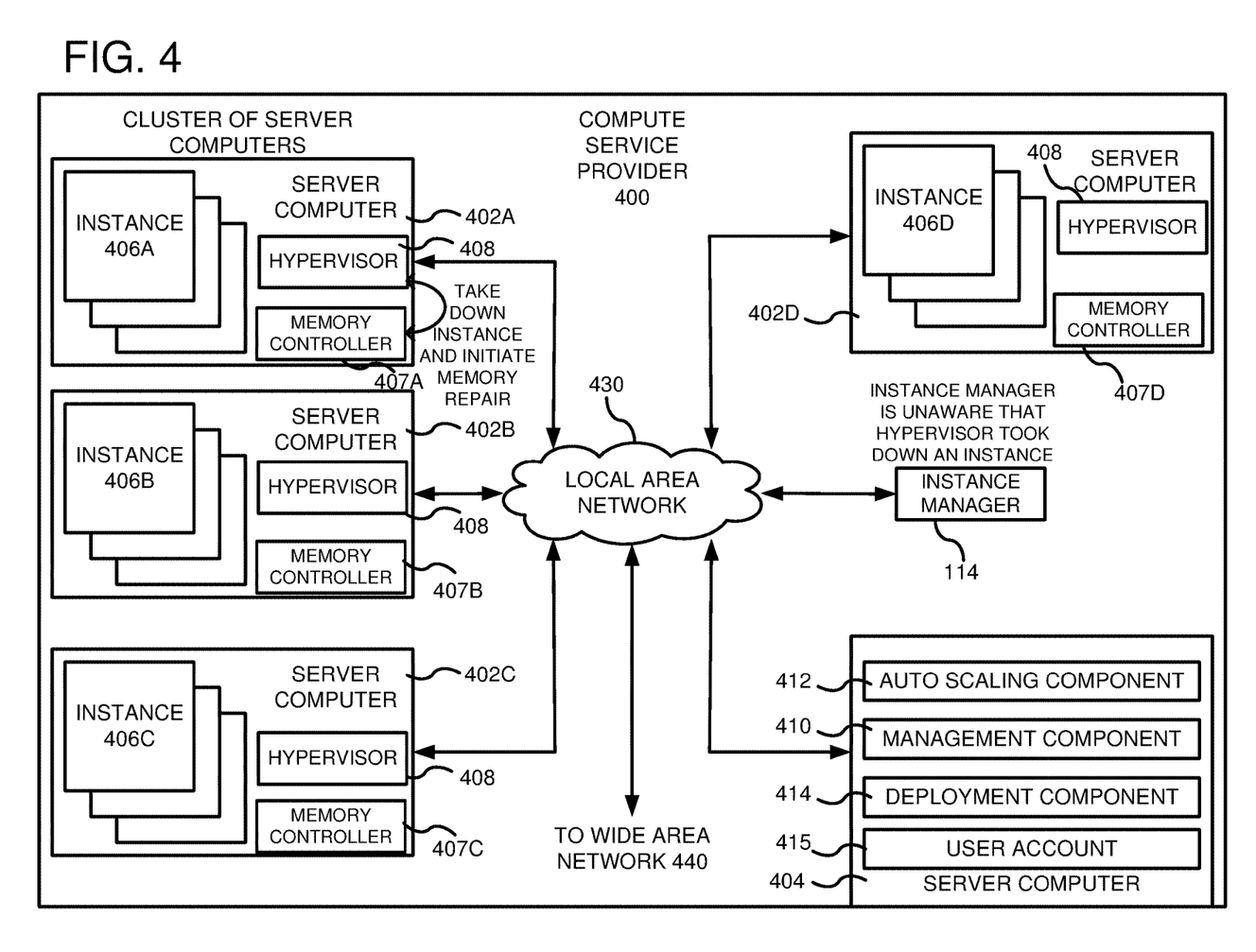
FIG. 4 is an example system diagram showing a plurality of virtual machine instances running in the multi-tenant environment, with a hypervisor initiating a memory repair through a memory controller.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end customers access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

In some implementations of the disclosed technology, the computer service provider 400 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to customers through a network, for example allowing customers to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows customers to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the customer, the hardware associated with the virtual computing devices can be scaled up or down depending upon the resources the customer requires. Customers can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by customers of the cloud provider network, which may be provisioned in customer accounts.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute a hypervisor 408 or another type of program configured to enable the execution of multiple instances 406 on a single server. Additionally, each of the instances 406 can be configured to execute one or more applications. Each server computer 402 can also include a memory controller 407A-407D to control memory (not shown) within the server computer. In the case of server computer 402A, the hypervisor 408 can take down one of the instances associated with a defective memory module identified by the memory controller 407A. Additionally, the hypervisor 408 can continue to make it appear as though a partition left by the terminated instance is not yet available to an external instance manager 114. As such, the instance manager 114 does not launch a new instance on the server computer 402A despite that a partition is available. The hypervisor 408 allows the other instances to continue to execute, but only terminates the instance associated with the defective memory. Once the memory controller 407A repairs the memory, the hypervisor 408 can notify the instance manager 114 that the partition is available.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

A network 430 can be utilized to interconnect the server computers 402A-402D and the server computer 404. The network 430 can be a local area network (LAN) and can be connected to a Wide Area Network (WAN) 440 so that end customers can access the compute service provider 400. It should be appreciated that the network topology illustrated in FIG. 4 has been simplified and that many more networks and networking devices can be utilized to interconnect the various computing systems disclosed herein.

Figure 5:
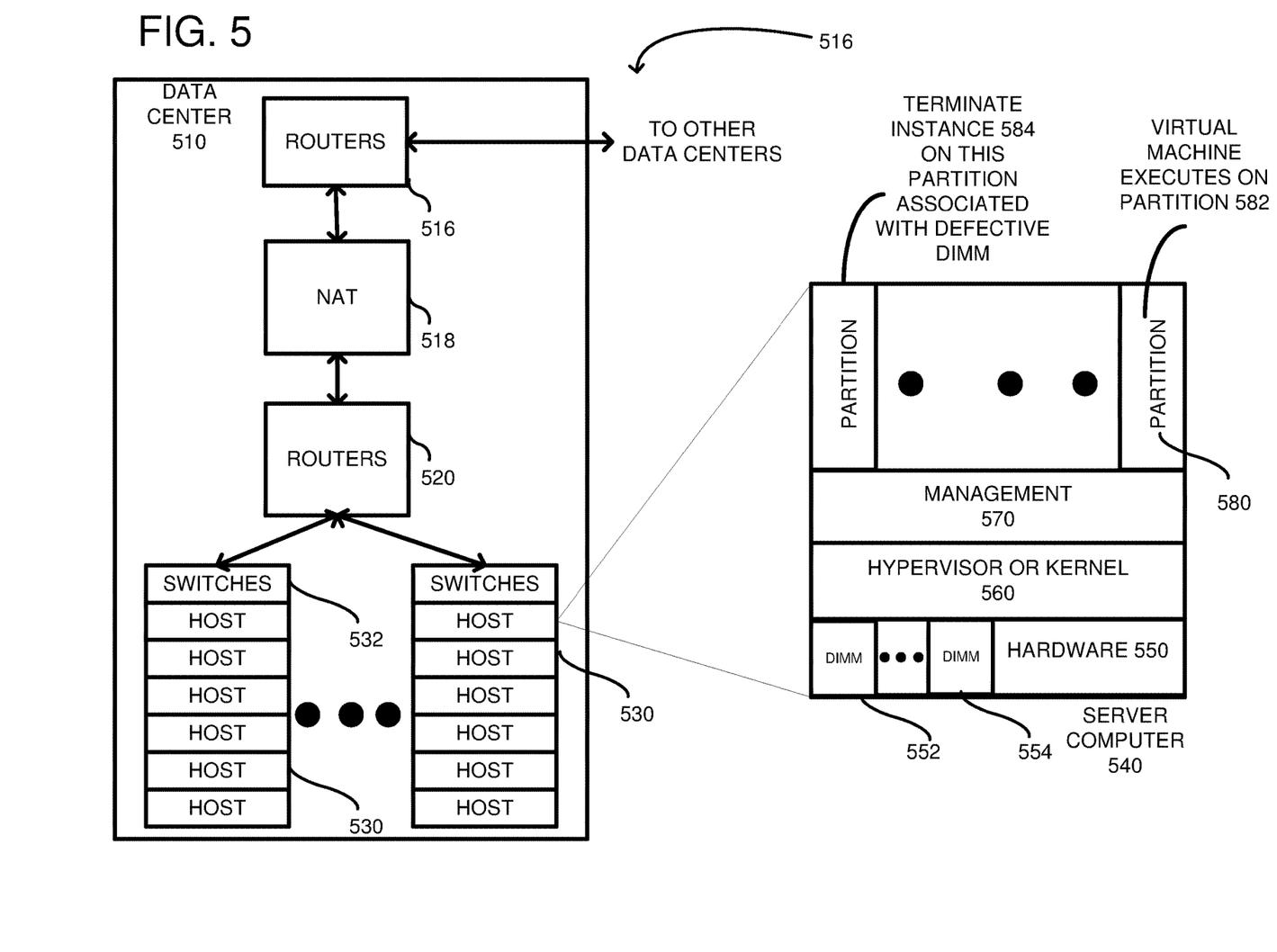
FIG. 5 is an example data center having a server computer with multiple partitions associated with multiple memory modules.

FIG. 5 illustrates a data center 510 used for executing virtual machines on a network of partitions and the physical hardware associated therewith. The data center 510 can be coupled to other data centers through a network of routers 516. The routers 516 read address information in a received packet and determine the packet's destination. If the router decides that a different data center contains a host server computer, then the packet is forwarded to that data center. If the packet is addressed to a host in the data center 510, then it is passed to a network address translator (NAT) 518 that converts the packet's public IP address to a private IP address. The NAT also translates private addresses to public addresses that are bound outside of the datacenter 510. Additional routers 520 can be coupled to the NAT to route packets to one or more racks of host server computers 530. Each rack 530 can include a switch 532 coupled to multiple host server computers. A particular host server computer is shown in an expanded view at 540.

Each host 540 has underlying hardware 550 including one or more CPUs, memory, storage devices, etc. The memory can include multiple DIMMs 552 through 554 (which can be any number of DIMMs) used to support virtual machines. Running a layer above the hardware 550 is a hypervisor or kernel layer 560. The hypervisor or kernel layer can be classified as a type 1 or type 2 hypervisor. A type 1 hypervisor runs directly on the host hardware 550 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 570 can be part of the hypervisor or separated therefrom and generally includes device drivers needed for accessing the hardware 550. The partitions 580 are logical units of isolation by the hypervisor. Each partition 580 can be allocated its own portion of the hardware layer's memory (e.g., 552), CPU allocation, storage, etc. Additionally, each partition can include a virtual machine and its own guest operating system. As such, each partition is an abstract portion of capacity designed to support its own virtual machine independent of the other partitions. As shown at 582, a first virtual machine executes on the partition 580. The virtual machine 582 can be associated with DIMM 554. The DIMM 552 can be used by a virtual machine 584 and the DIMM 552 can become defective. Through a memory map that identifies which DIMMs are associated with which virtual machines, the hypervisor 560 can identify which virtual machine to terminate. As a result, the hypervisor 560 can terminate the virtual machine 584 associated with the DIMM 552 so that a memory repair can be performed. During the memory repair of DIMM 552, the virtual machine 582 can remain executing. Additionally, the hypervisor 560 can remain executing. In some cases, there may be a negligible suspension of the virtual machine 582 or the hypervisor, but in the microsecond range, such that a customer would have difficulty detecting the suspension. The suspension occurs during an initial interrupt, but once the memory repair starts, the hypervisor 560 and the other virtual machine 582 can resume. After the memory 552 is repaired, the hypervisor 550 can launch its own testing virtual machine on the partition 584. If the DIMM 552 passes a memory test performed by the testing virtual machine, then the hypervisor 560 can terminate the testing virtual machine and allow the partition 584 to be available.

Figure 6:
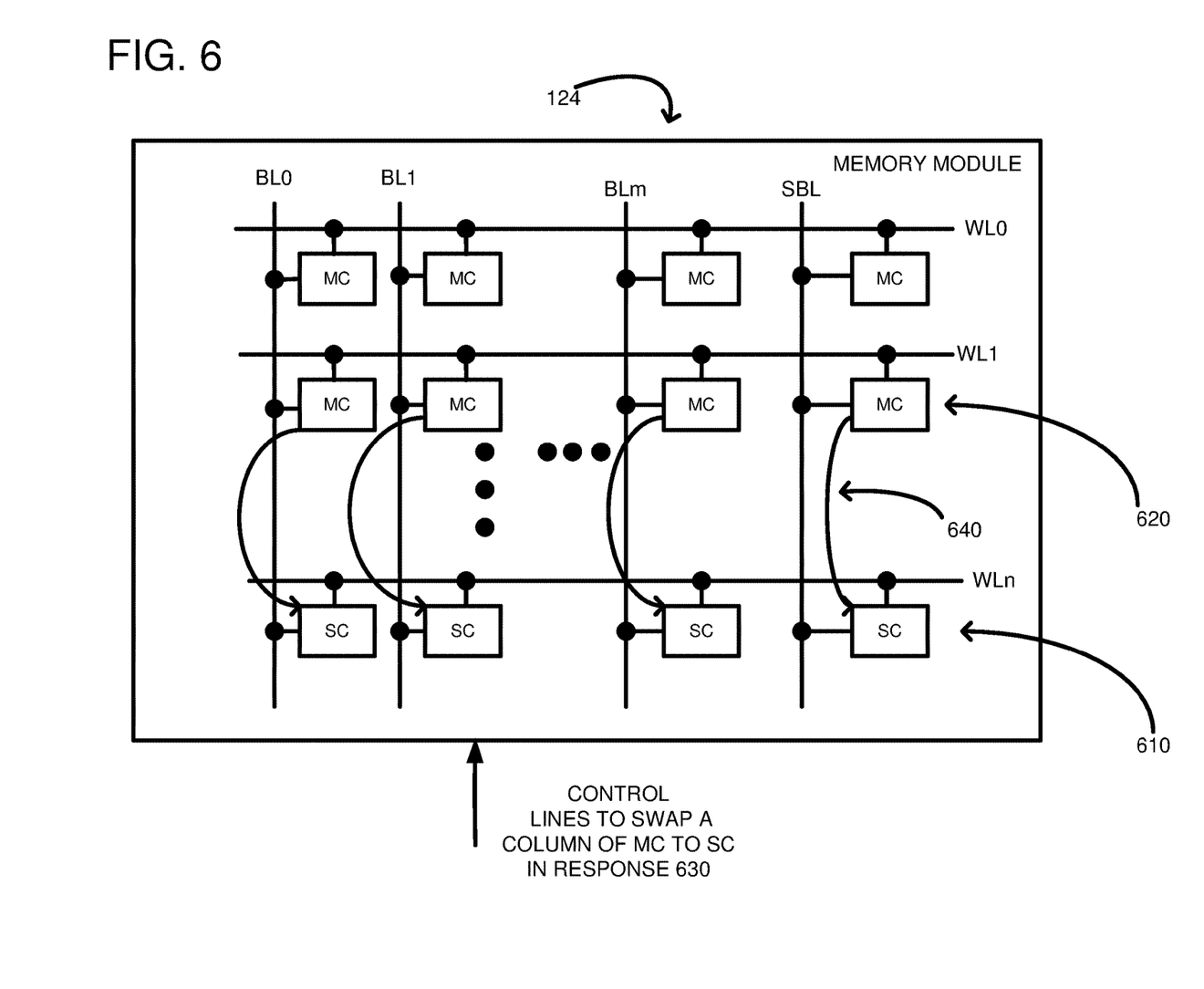
FIG. 6 shows an example memory module with a spare memory row used for repairing the memory module.

FIG. 6 shows details of one of the memory module 124. The memory module 124 includes a plurality of rows of memory cells (MC) connected to bit lines BL0-BLm and word lines WL0-WLn. The memory module 124 is designed with a spare row of memory bits (spare cells are designated "SC") shown at 610. In the illustrated example, a memory cell in row 620 is detected as being faulty. Although the memory control circuit 160 (FIG. 1) is not shown, a control signal 630 provides control signals indicating to replace row 620 with the spare row 610. As a result, each bit is copied from the row 620 to a corresponding bit position for row 610, as indicated at 640. After the row 620 is swapped to the spare row 610, the memory 142 is considered repaired and is no longer defective. Both soft and hard PPRs can be supported according to embodiments described herein.

Figure 7:
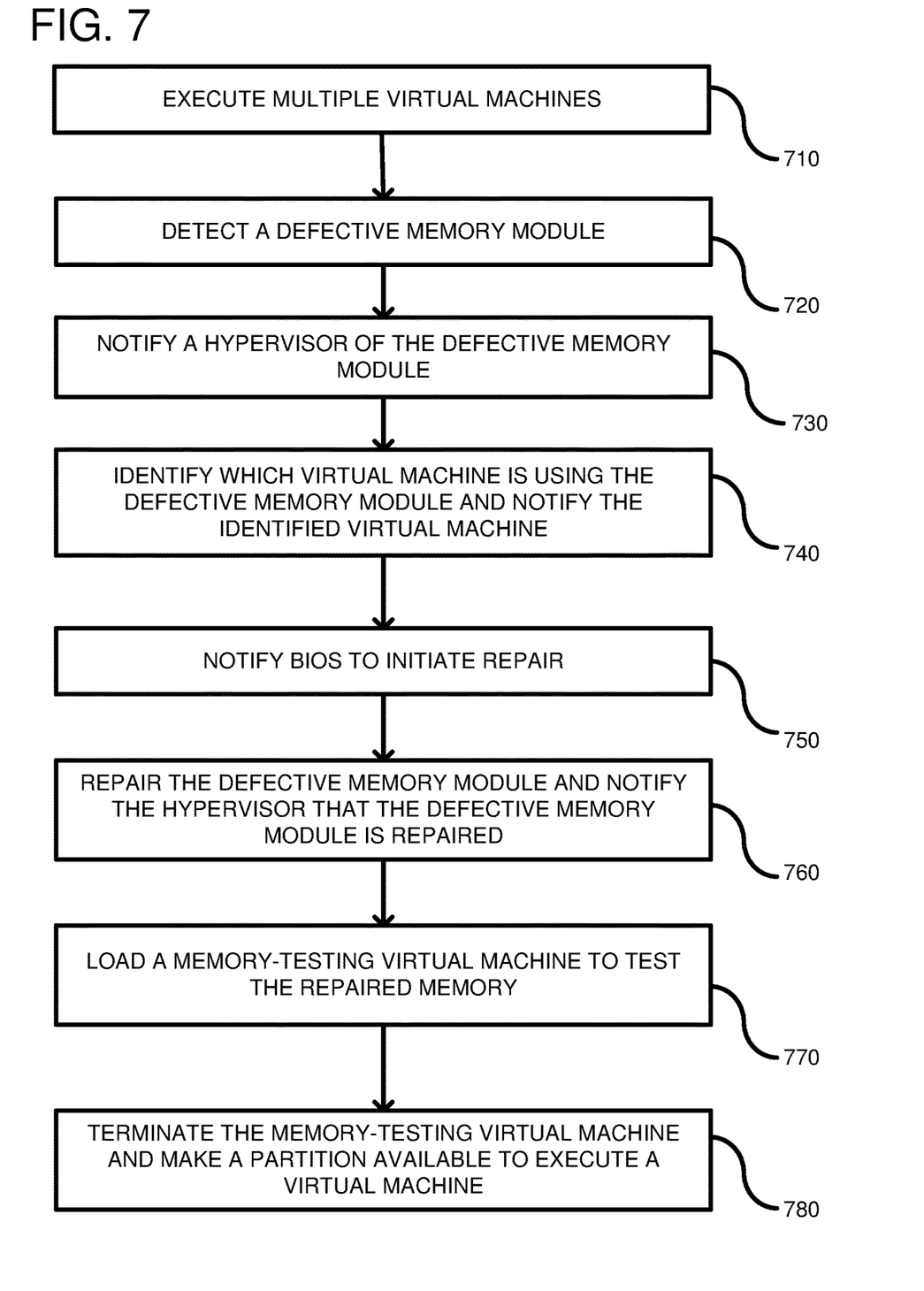
FIG. 7 is a flowchart according to one embodiment for repairing an uncorrectable memory error without shutting down a host server computer.

FIG. 7 is a flowchart according to one embodiment. In process block 710, multiple virtual machines are executed.

For example, in FIG. 1, multiple virtual machines 140 can be executed on a host server computer 110. At process block 720, a defective memory module can be detected. For example, in FIG. 1, a memory controller 160 can detect an error in one of the memory modules 124. In process block 730, a hypervisor is notified of the defective memory module. For example, in FIG. 1, the memory controller 160 can notify the hypervisor 150. In process block 740, the virtual machine is identified that is using the defective memory module. For example, in FIG. 5, the virtual machine 584 is identified by the hypervisor 560 as associated with the defective DIMM 552. In process block 750, BIOS is notified to initiate a memory repair of the defective memory. For example, in FIG. 2, the BIOS 260 can be notified by the hypervisor 240. In process block 760, the defective memory module is repaired and the hypervisor is notified. For example, in FIG. 1, the trusted controller 170 can notify the hypervisor 150 that the memory repair is complete. In process block 770, the hypervisor can load a memory-testing virtual machine to test the repaired memory. For example, in FIG. 1, the hypervisor 150 can load the testing virtual machine 142 to test the memory 124. In process block 780, the memory-testing virtual machine is terminated to make the partition available to another virtual machine. For example, in FIG. 5, the virtual machine 584 is terminated and the partition is available to another virtual machine if the memory test passed. Otherwise, the partition can be blocked.

Figure 8:
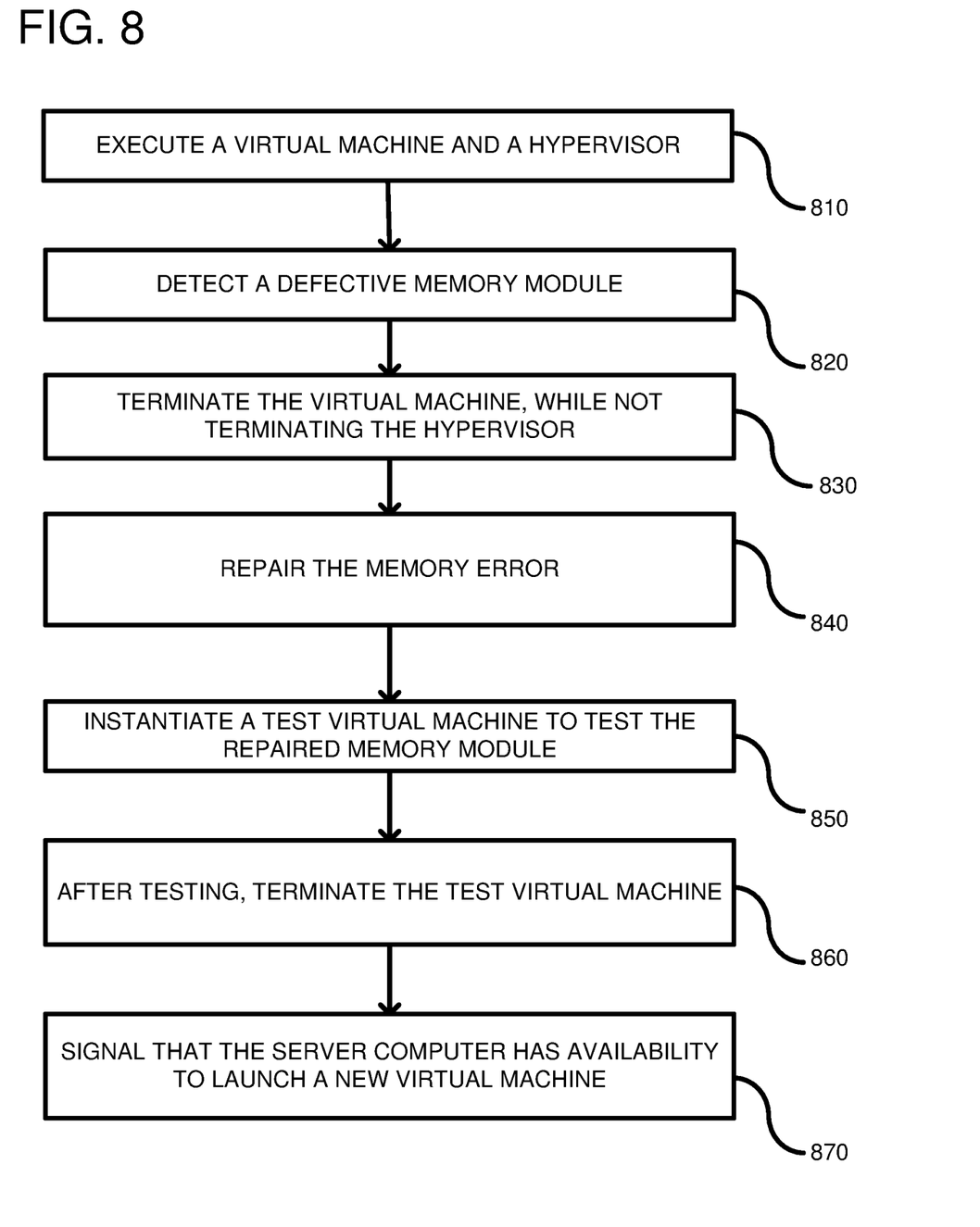
FIG. 8 is a flowchart according to another embodiment for repairing an uncorrectable memory error without shutting down a host server computer.

FIG. 8 is a flowchart according to another embodiment. In process block 810, a virtual machine is executed and a hypervisor is executed. For example, FIG. 2 shows a virtual machine 242 and a hypervisor 240 executing in a host server 212. In process block 820, a defective memory module is detected. For example, in FIG. 2, the defective memory module 230 is detected by the memory controller. In process block 830, the virtual machine is terminated while not terminating the hypervisor. For example, in FIG. 5, virtual machine 584 is terminated while the hypervisor 560 remains activated. In process block 840, the memory is repaired. For example, in FIG. 5, the memory 552 can be repaired. In process block 850, a second virtual machine is instantiated to test the repaired memory module. For example, in FIG. 1, the testing virtual machine 142 is loaded into the partition vacated by virtual machine 140. In process block 860, after testing, the second virtual machine is terminated. For example, the testing virtual machine 142 can be terminated, once completed. Finally, in process block 870, the server computer signals that it has availability. In FIG. 1, such a signal can be passed from the hypervisor 150 to the network interface card 120 or the server computer 114.

Figure 9:
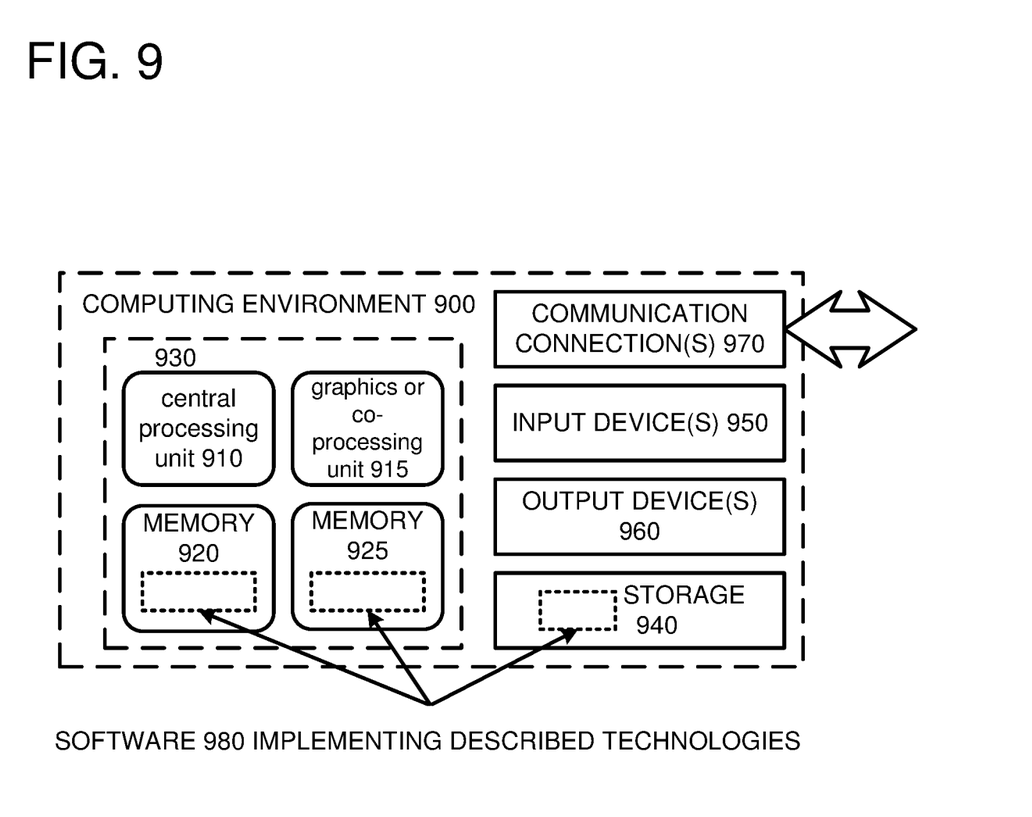
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of repairing memory in a server computer, the method comprising:

executing multiple virtual machines in respective partitions on the server computer through control of a hypervisor;

detecting a defective memory module of a memory;

notifying the hypervisor of the defective memory module;

identifying which virtual machine is using the defective memory module and notifying the identified virtual machine of the defective memory module and in response to the detecting of the defective memory module, terminating the virtual machine to leave an open partition;

notifying, by the hypervisor, a system management Basic Input/Output System (BIOS) that initiates a memory repair of the defective memory module so that the hypervisor initiates the repairing of the memory;

repairing the defective memory module and notifying the hypervisor that the defective memory module is now a repaired memory module;

loading a memory-testing virtual machine on the open partition, wherein the memory-testing virtual machine tests the repaired memory module;

terminating the memory-testing virtual machine and making the open partition available to execute another virtual machine; and wherein the server computer includes multiple processors and the system management BIOS interrupts only a processor which is executing the virtual machine.

2. The method of claim 1, wherein the server computer includes multiple processors and the notifying the system management BIOS by the hypervisor is via an interrupt, wherein the interrupt suspends the hypervisor.

3. The method of claim 1, wherein the repairing of the defective memory module is by a memory controller performing a Post Package Repair (PPR).

4. The method of claim 1, wherein the hypervisor signals that the open partition is in use during the repairing.

5. The method of claim 1, wherein the server computer is not powered down during the repairing.

6. A method, comprising:

executing a virtual machine and a hypervisor on a server computer;

detecting a memory error in a memory module being used by the virtual machine;

in response to the detecting of the memory error, terminating the virtual machine, while not terminating the hypervisor;

repairing the memory error in the memory module, wherein the hypervisor initiates the repairing of the memory module through a system management Basic Input/Output System (BIOS) executing on the server computer and wherein the server computer includes multiple processors and the system management BIOS interrupts only a processor which is executing the virtual machine;

instantiating a test virtual machine to test the repaired memory module;

after testing the repaired memory module, terminating the test virtual machine; and signaling that the server computer has availability to launch a new virtual machine.

7. The method of claim 6, wherein the hypervisor initiates the repairing of the memory through a Baseboard Management Controller (BMC) executing on the server computer.

8. The method of claim 6, wherein the hypervisor executing on the server computer does not signal availability for a new virtual machine after termination of the virtual machine.

9. The method of claim 6, wherein the detecting the memory error includes notifying the hypervisor from a Central Processing Unit hardware.

10. The method of claim 9, wherein the hypervisor issues an interrupt to a system management Basic Input/Output System (BIOS) executing on the server computer in response to receiving the notification from the Central Processing Unit hardware.

11. The method of claim 6, wherein the repairing is a soft Post Package Repair (PPR).

12. A computer, comprising:

multiple processors for executing a virtual machine and a hypervisor;

a plurality of memory modules;

a memory controller coupled between the multiple processors and the plurality of memory modules;

wherein the hypervisor is configured to:

receive an indication of a defective memory module from the memory controller;

notify the virtual machine that the memory module being used by the virtual machine is defective and terminating the virtual machine in response to the indication of the defective memory module;

notify a trusted controller that the memory module is defective so that the trusted controller repairs the memory, wherein the trusted controller is a system management Basic Input/Output System (BIOS) and the hypervisor issues an interrupt to the BIOS executing on a server computer in response to receiving the indication from the memory controller; and launch a test virtual machine to test the repaired memory.

13. The computer of claim 12, wherein the trusted controller is a system management Basic Input/Output System (BIOS) that initiates the repair through an interrupt of the multiple processors.

14. The computer of claim 12, wherein the trusted controller is a Baseboard Management Controller (BMC) that initiates the repair through an interrupt of the multiple processors.

15. The computer of claim 12, wherein the memory controller is configured to perform a Post Package Repair (PPR) to repair the memory.

16. The computer of claim 12, wherein the hypervisor is further configured to terminate the test virtual machine after the memory is tested and to transmit a notice that there is availability for another virtual machine.

17. The computer of claim 12, wherein the plurality of memory modules are Dual In-line Memory Modules (DIMMs) comprising a series of Dynamic Random-access Memory (DRAM) integrated circuits.

* * * * *